US009969419B2

(12) United States Patent
Kawaguchi

(10) Patent No.: US 9,969,419 B2
(45) Date of Patent: May 15, 2018

(54) PREIMPREGNATED CARBON FIBER STEERING WHEEL

(71) Applicant: TK Holdings Inc., Auburn Hills, MI (US)

(72) Inventor: Makoto Kawaguchi, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 49 days.

(21) Appl. No.: 15/088,911

(22) Filed: Apr. 1, 2016

(65) Prior Publication Data

US 2017/0282954 A1 Oct. 5, 2017

(51) Int. Cl.
*B62D 1/06* (2006.01)
*B29C 65/02* (2006.01)
*B29C 65/48* (2006.01)
*B29L 31/30* (2006.01)

(52) U.S. Cl.
CPC ............... *B62D 1/06* (2013.01); *B29C 65/02* (2013.01); *B29C 65/48* (2013.01); *B29L 2031/3047* (2013.01)

(58) Field of Classification Search
CPC .......................................... B62D 1/06
USPC ............................................. 428/61
See application file for complete search history.

(56) References Cited

U.S. PATENT DOCUMENTS

2014/0339211 A1* 11/2014 Barfuss ............... B60N 2/002
219/202

\* cited by examiner

*Primary Examiner* — Brent T O'Hern
(74) *Attorney, Agent, or Firm* — Meunier Carlin & Curfman LLC

(57) ABSTRACT

Various implementations include an improved steering wheel and methods of making the same. The improved steering wheel includes a carbon fiber mat that is preimpregnated with an epoxy resin that is wrapped adjacent at least a portion of a steering wheel frame. The edges of the mat that overlap are coupled together directly via the epoxy resin by heat curing the mat. The preimpregnated mat does not crack when subjected to thermal cycle tests, which is an improvement over prior art steering wheels that include raw carbon fiber mats that are coupled to the frame using a separate adhesive.

16 Claims, 4 Drawing Sheets

PREIMPREGNATED CARBON FIBER STEERING WHEEL

BACKGROUND

Many vehicle steering wheels have an annular shaped rim, a central hub portion, and spokes that extend between the rim and hub portions. The steering wheel includes a rigid frame, and a substrate (e.g., PC-ABS or polyurethane) may be overlaid around the rim portion (and, possibly, other portions) of the frame. A skin is disposed around the substrate to form the outer surface of the rim, spokes and/or hub.

The skin may include an elongated mat that has first and second ends that are opposite each other, and first and second elongated side edges extending between the first and second ends that are opposite each other. The skin is coupled to the substrate via an adhesive that is applied to the substrate and/or the skin at the time of assembly, and the skin is adhered to the substrate. In addition, one of the side edges of the skin wraps over the other side edge and adheres thereto.

Materials such as leather and polyurethane have been used as skins in automobile vehicle steering wheels. These materials can withstand the temperature cycles expected within a cabin of the automobile without cracking. Raw carbon fiber skins have also been used in some cars, such as luxury vehicles, but the raw carbon fiber skins are prone to cracking along the seams of the edges and the ends in response to the typical temperature cycles expected within the cabin. Thus, raw carbon fiber skins are not optimal for vehicles that are subjected to the typical temperature cycles.

Therefore, there is a need in the art for an improved skin and method of assembly of the skin to the steering wheel.

BRIEF SUMMARY

An improved steering wheel, according to various implementations, includes a carbon fiber mat that is preimpregnated with an epoxy resin prior to being assembled over a frame of the steering wheel. The preimpregnated carbon fiber mat has a first edge and a second edge that are opposite and spaced apart from each other and an inner surface and an outer surface. The inner surface comprises an overlap portion adjacent the first edge. The preimpregnated carbon fiber mat is disposed around the frame such that the inner surface of the mat faces the frame, and the overlap portion overlaps a portion of the outer surface adjacent the second edge and adheres directly to the outer surface via the epoxy resin in the preimpregnated carbon fiber mat during curing without a separate adhesive. The preimpregnated mat does not crack after being subjected to typical temperature cycles.

In some implementations, the inner surface of the mat includes an adhesive portion. An adhesive that is separate from the epoxy resin is disposed on the adhesive portion for coupling the adhesive portion adjacent the frame. For example, the adhesive may have a viscosity of at least 10,000 mPa·s.

In some implementations, a substrate is disposed between the inner surface of the preimpregnated carbon fiber mat and the frame. The substrate may include a polymeric material, such as PC-ABS or polyurethane. In such an implementation, the adhesive of the adhesive portion couples the mat to the substrate.

In some implementations, a clear coating is disposed on the outer surface of the preimpregnated carbon fiber mat.

In some implementations, a width of the overlap portion is from about 8 to about 16 percent of a width of the preimpregnated carbon fiber mat. For example, the width of the overlap portion is from about 10 to about 20 millimeters, according to some implementations.

In some implementations, the preimpregnated carbon fiber mat comprises from about 25 wt % to about 70 wt % epoxy resin, based on the total weight of the preimpregnated carbon fiber mat (i.e., the carbon fiber mat including the epoxy resin). And, in certain implementations, the preimpregnated carbon fiber mat comprises from about 40 wt % to about 45 wt % epoxy resin, based on the total weight of the preimpregnated carbon fiber mat. The preimpregnated carbon fiber mat may have a basis weight of from about 300 $g/m^2$ to about 400 $g/m^2$.

Various implementations include a method of wrapping at least a portion of a steering wheel for a vehicle that includes: (1) wrapping a preimpregnated carbon fiber mat preimpregnated with an epoxy resin around at least a portion of a frame of a steering wheel, (2) disposing an overlap portion of an inner surface of the mat, which is adjacent a first edge of the mat, over a portion of an outer surface adjacent a second edge of the mat and in direct contact with the portion of the outer surface; and (3) heat curing the preimpregnated carbon fiber mat. During curing, the epoxy resin directly joins the overlap portion to the portion of the outer surface adjacent the second edge.

In some implementations, the method further includes wrapping a support material around the mat prior to and during curing to support the mat during curing. And, in a further implementation, the method further includes removing the support material after curing. The support material may include a plastic wrap, for example.

In some implementations, the method also includes applying an adhesive that is separate from the epoxy resin between an adhesive portion of the inner surface and a substrate disposed between the frame and the inner surface of the preimpregnated carbon fiber mat and wrapping the adhesive portion around the substrate. The adhesive portion is separate from the overlap portion. Applying the adhesive may include applying the adhesive to the adhesive portion of the inner surface and/or to the substrate.

BRIEF DESCRIPTION OF THE DRAWINGS

The components in the drawings are not necessarily to scale relative to each other and like reference numerals designate corresponding parts throughout the several views.

DETAILED DESCRIPTION

Various implementations include an improved steering wheel and methods of making the same. The improved steering wheel includes a preimpregnated carbon fiber mat that is preimpregnated with an epoxy resin that is wrapped adjacent at least a portion of a steering wheel frame. The terms "carbon fiber mat" and "preimpregnated carbon fiber mat" are used interchangeably and refers to a mat preimpregnated with a thermosetting resin. Such preimpregnated carbon fiber mat are generally available and are manufactured by Pro Systems, under the tradename TC 203 T ES125. The edges of the mat that overlap are coupled together directly via the epoxy resin by heat curing the mat. The preimpregnated carbon fiber mat does not crack when subjected to thermal cycle tests, which is an improvement over prior art steering wheels that include raw carbon fiber mats that are coupled to the frame using a separate adhesive.

Figure 1:
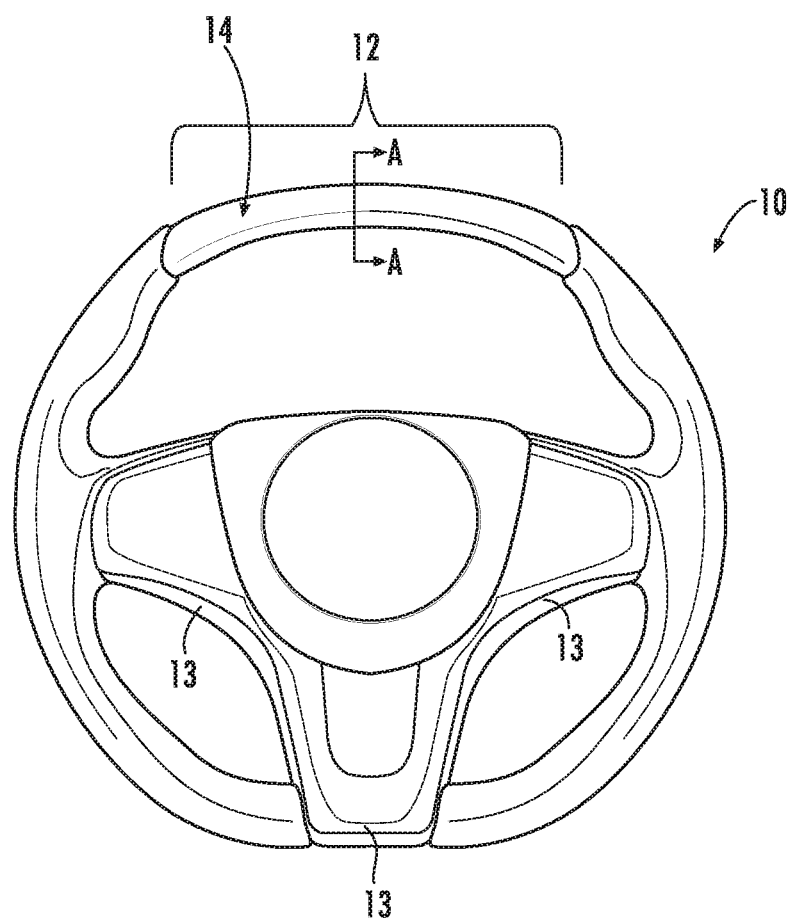
FIG. 1 illustrates a front view of a steering wheel according to one implementation.

FIG. 1 illustrates an exemplary steering wheel according to one implementation. As shown, the steering wheel 10 includes at least one portion 12 that is wrapped in preimpregnated carbon fiber mat 14. The preimpregnated carbon fiber mat 14 may also cover other portions of the steering wheel 10, such as portion 13 covering portions of spokes of the steering wheel 10.

Figure 2A:
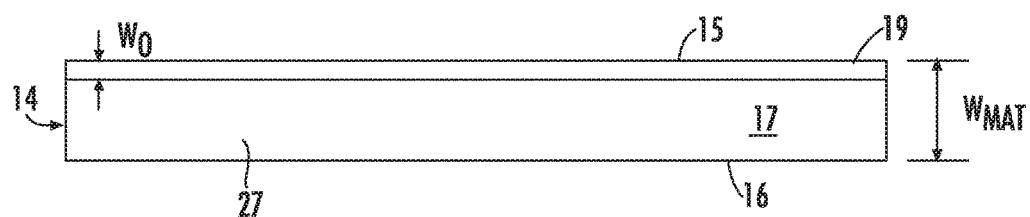
FIG. 2A and FIG. 2B illustrate perspective views of the preimpregnated carbon fiber mat prior to installation around a portion of a steering wheel.
Figure 2B:
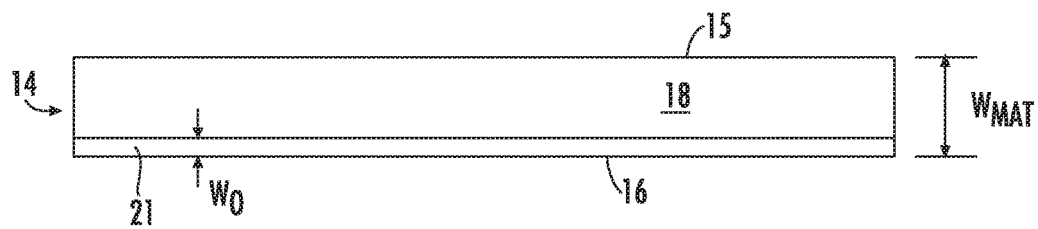

FIGS. 2A and 2B illustrate the preimpregnated carbon fiber mat 14 prior to installation onto the steering wheel 10. The mat 14 includes a first edge 15 and a second edge 16 that are opposite and spaced apart from each other and an inner surface 17 and an outer surface 18. The inner surface 17 comprises an overlap portion 19 adjacent the first edge 15 and an adhesive portion 27 between the overlap portion 19 and the second edge 16. The outer surface 18 includes an overlap portion 21 adjacent the second edge 16.

Figure 3:
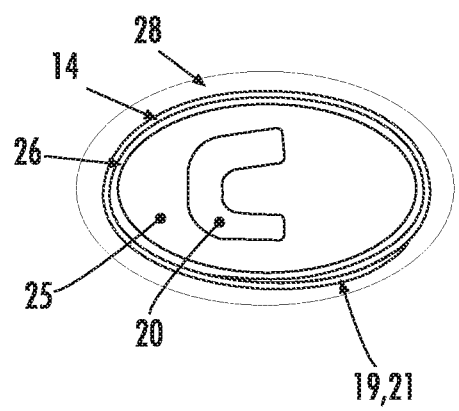
FIG. 3 illustrates a cross sectional view of the steering wheel in FIG. 1 as taken through the A-A line.

As shown in FIG. 3, the steering wheel 10 includes a substrate 25 disposed around the frame 20, and the preimpregnated carbon fiber mat 14 is wrapped around the substrate 25. The preimpregnated carbon fiber mat 14 is disposed around the frame 20 such that the inner surface 17 of the mat 14 faces the frame 20. The overlap portion 19 of the inner surface 17 overlaps the overlap portion 21 of the outer surface 18 and adheres directly to the outer surface 18 via the epoxy resin in the carbon fiber mat 14 after heat curing, without using a separate adhesive between the overlap portions 19, 21.

During heat curing, the preimpregnated carbon fiber mat 14 may be subjected to an elevated temperature and optionally elevated pressure so that the epoxy resin undergoes a chemical reaction to adhere the overlap portion 19 to the overlap portion 21. The preimpregnated carbon fiber mat may be transformed into a structural material that is highly durable, temperature resistant, stiff, and lightweight. The preimpregnated carbon fiber mat 14 can be heat cured in an autoclave, an oven, a vacuum bag, or other heating device. In one implementation, the preimpregnated carbon fiber mat 14 can be heat cured in an oven. For example, the preimpregnated carbon fiber mat 14 can be baked in an oven at a temperature of at least about 100° C. for at least 2 hours. The preimpregnated carbon fiber mat may be wrapped in a support, such as a plastic wrap, for example, during curing.

An adhesive 26 is disposed on the substrate 25 and at least a portion of the inner surface 17 of the mat 14. The adhesive 26 is separate from the epoxy resin that is impregnated into the mat 14. The viscosity of the adhesive 26 may be of a suitable amount to prevent or reduce penetration of the adhesive 26 into the carbon fiber mat 14 to which it is applied. Said another way, a substantial portion of the adhesive 26 remains on the surface of the substrate 25 to provide adhesion. The adhesive 26 may have a viscosity of at least 10,000 mPa·s. For example, the adhesive 26 may have a viscosity of from about 10,000 to about 150,000 mPa·s such as from about 10,000 to about 20,000 mPa·s. Suitable adhesives 26 that may be used include polyurethane-based adhesives. Such polyurethane-based adhesives are generally available and are manufactured by Ravier Italia S.P.A., under the tradename Adesivo™ XP4294.

A clear coating 28 may be disposed adjacent the outer surface 18 of the mat 14. The clear coating may include one or more coating layers. In one implementation, a primer may be disposed directly on the outer surface 18 of the carbon fiber mat 14, and the clear coating 28 may be disposed directly onto the primer. In some cases, the primer can create a base for almost any topcoat finish. The primer may contain a transparent urethane-based coating material. The clear coating 28 may further include one or more additional coating layers disposed on the primer. In some cases, the one or more additional coating layers can impart the impression of thickness to the clear coating 28. The one or more additional coating layers may contain a transparent urethane-based or polyester-based coating material. In addition, the coating layers may provide various types of finishes, including, for example, a high-gloss, a semi-gloss, or a matte finish. The total thickness of the clear coating and primer may be from about 0.5 to about 1 mm.

A surface coating may be disposed on an outer surface of the clear coating 28, for example, on the one or more additional coating layers. In some cases, the surface coating layer can impart various surface properties to the steering wheel, and various components may be used therein in accordance with the desired surface properties. For example, the surface coating layer may have characteristics such as light fastness, UV-light cutting ability, water resistance, chemical resistance, or temperature resistance. In some cases, the surface coating layer may include a matte paint. The matte paint generally includes a matting agent such as silicate particles. The matte paint may also contain a transparent urethane-based coating material. The thickness of the surface coating layer can be at least about 50 µm to about 60 µm.

Figure 4:
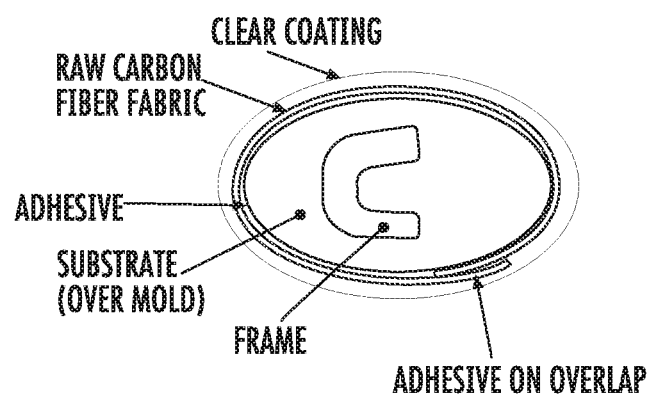
FIG. 4 illustrates a cross sectional view of a prior art steering wheel.

FIG. 4 illustrates how raw carbon fiber mats have been installed in prior art steering wheels. In particular, the adhesive is applied to the inner surface of the raw carbon fiber mat, and the adhesive is used to couple the overlap portions of the raw carbon fiber mat. However, as noted above, cracking occurs along the overlap seam after the steering wheel is subjected to thermal cycle tests. The "raw carbon fiber" mat as used herein refers to a carbon fiber mat that does not include a thermosetting resin for curing the mat.

The thermal cycle test (or temperature cycling) refers to a process of cycling through two temperature extremes, typically at relatively high rates of change. The cracking phenomena described above may be induced by thermal cycling. The thermal cycle test may include a high temperature extreme of 100° C. and a thermal cycle of 80° C. to −30° C. and may be repeated several times per test part to prove satisfactory performance. The high temperature extreme at 100° C. and thermal cycle at 80° C. temperature may be implemented in an oven maintained at the desired temperature; the thermal cycle for the −30° C. test may be implemented in a racked chamber maintained at −30° C. with liquid nitrogen. The thermal cycle test can include a period of time (conditioning time) at each extreme, with a transition time between chambers, for a set number of cycles. The test may be carried out at various levels of humidity as well as under ambient conditions. In some implementations, the thermal cycle test can include cycling through 80° C. to −30° C. for at least 40 times or at least 45 times. In some implementations, the test can include a conditioning time at a high temperature extreme of 100° C. for a period of time including greater than 500 hours to greater than 950 hours. The number and type of defects/cracks observed can be counted.

Referring back to FIG. 3, the frame 20, according to some implementations, may include a magnesium die cast frame. The magnesium die cast may consist of pure magnesium or a magnesium alloy. However, other suitable materials may be used for the frame 20 including an aluminum alloy, a high rigidity synthetic resin, or a combination thereof. In addition, the substrate 25 may be formed of polycarbonate-acrylonitrile butadiene styrene (PC-ABS) or other suitable polymers, such as polyurethane, polyolefin for example polyethylene, polyamide, polystyrene, polysulfone, polyimide, polybutadiene, butadiene-styrene copolymer, polyester, halogenated polymer for example polyvinyl chloride, phenolic and melamine resins, polyester resin, or urea resin.

A width Wo of each overlap portion 19, 21 may be from about 8 to about 16 percent of a width Wmat of the carbon fiber mat 14, wherein width is measured within a plane that is orthogonal to the first edge 15 and the second edge 16, according to some implementations. For example, the width of each overlap portion 19 is from about 10 to about 20 millimeters as measured from the first edge 15 in a direction toward the second edge 16. For example, the width of each overlap portion 21 is from about 10 to about 20 millimeters as measured from the second edge 16 in a direction toward the first edge 15.

In some implementations, the preimpregnated carbon fiber mat 14 includes from about 25 wt % to about 70 wt % epoxy resin, based on the total weight of the preimpregnated carbon fiber mat 14. For example, the preimpregnated carbon fiber mat 14 may include from about 40 wt % to about 45 wt % epoxy resin, based on the total weight of the preimpregnated carbon fiber mat 14. The preimpregnated carbon fiber mat 14 may have a basis weight of from about 300 g/m² to about 400 g/m², for example. In one implementation, the carbon fiber mat 14 may have a basis weight of about 345 g/m².

Figure 5:
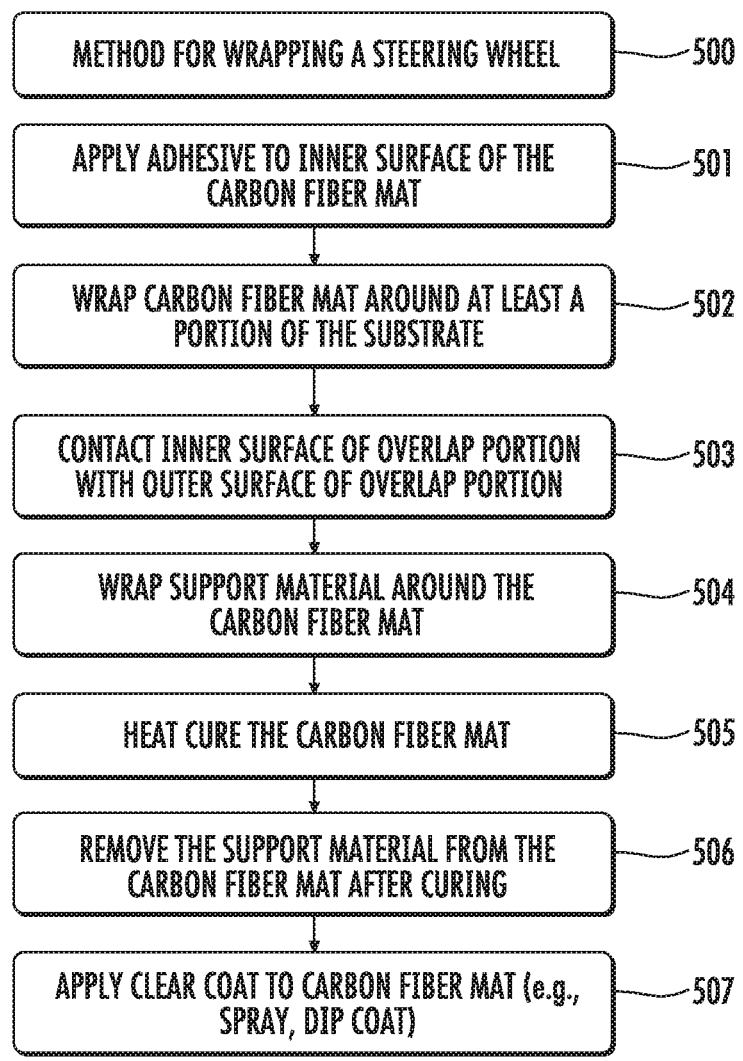
FIG. 5 illustrates a flow chart illustrating a method of wrapping at least a portion of a steering wheel, according to some implementations.

FIG. 5 illustrates a flowchart showing a method 500 for wrapping at least a portion of a steering wheel 10 with a preimpregnated carbon fiber mat, such as the mat 14 described above in relation to FIGS. 2A through 3. Beginning at step 501, adhesive, such as adhesive 26, that is separate from the epoxy resin is applied to the adhesive portion 27 of the inner surface 17 of the preimpregnated carbon fiber mat 14 and/or the substrate 25 disposed around the frame 20 of the steering wheel 10. As noted above in relation to FIG. 2A, the adhesive portion 27 is separate from the overlap portion 19 on the inner surface 17 of the mat 14. Applying the adhesive 26 may include applying the adhesive to the adhesive portion 27 of the inner surface 17 and/or to the substrate 25.

The preimpregnated carbon fiber mat 14 is then wrapped around at least a portion of the substrate 25, as shown in step 502. Next, in step 503, the overlap portion 19 of the inner surface 17 of the mat 14, which is adjacent the first edge 15 of the mat 14, is disposed over the overlap portion 21 of the outer surface 18 adjacent the second edge 16 of the mat 14 and in direct contact with the overlap portion 21. In step 504, a support material is wrapped around the mat 14 to support the mat 14 during curing. The support material may include plastic wrap, for example. Then, in step 505, the mat is heat cured. During curing, the epoxy resin directly couples the overlap portions 19, 21 together. Next, in step 506, the support material is removed after curing. Then, in step 507, a clear coating 28 is applied adjacent the outer surface 18 of the carbon fiber mat 14 after removing the support material.

In addition, the method may further include applying a primer directly to the carbon fiber mat, and applying one or more additional clear coating layers to the primer. The one or more additional coating layers may include, for example a clear coating and a matte paint. The clear coating may be used for providing a glossy finish, for example, and the matte paint may be added to provide a matte finish. The primer and the one or more additional coating layers may be independently applied to the mat by spraying, dipping, or roller coating, for example. However, in other implementations, other types of clear coatings may be applied, and applying the clear coatings may include one or more steps.

Various modifications of the devices and methods in addition to those shown and described herein are intended to fall within the scope of the appended claims. Further, while only certain representative devices and method steps disclosed herein are specifically described, other combinations of the devices and method steps are intended to fall within the scope of the appended claims, even if not specifically recited. Thus, a combination of steps, elements, components, or constituents may be explicitly mentioned herein. However, other combinations of steps, elements, components, and constituents are included, even though not explicitly stated. The term "comprising" and variations thereof as used herein is used synonymously with the term "including" and variations thereof and are open, non-limiting terms.

The invention claimed is:

1. A steering wheel for a vehicle comprising:
   a frame; and
   a preimpregnated carbon fiber mat comprising an epoxy resin, the preimpregnated carbon fiber mat having a first edge and a second edge that are opposite and spaced apart from each other and an inner surface and an outer surface,
   wherein:
   the preimpregnated carbon fiber mat is disposed around the frame such that the inner surface faces the frame, and
   a portion of the inner surface adjacent the first edge overlaps a portion of the outer surface adjacent the second edge and adheres directly to the outer surface via the epoxy resin in the preimpregnated carbon fiber mat during heat curing without a separate adhesive.

2. The steering wheel of claim 1, wherein the inner surface further comprises an adhesive portion, wherein an adhesive separate from the epoxy resin is disposed on the adhesive portion for coupling the adhesive portion adjacent the frame.

3. The steering wheel of claim 2, wherein the adhesive has a viscosity of at least 10,000 mPa·s.

4. The steering wheel of claim 1, further comprising a substrate disposed between the inner surface of the preimpregnated carbon fiber mat and the frame.

5. The steering wheel of claim 4, wherein the substrate is derived from a polycarbonate-acrylonitrile butadiene styrene copolymer.

6. The steering wheel of claim 4, wherein the inner surface further comprises an adhesive portion, wherein an adhesive separate from the epoxy resin is disposed on the adhesive portion for coupling the adhesive portion to the substrate.

7. The steering wheel of claim 1, wherein a width of the portion of the inner surface adjacent the first edge is from about 8 to about 16 percent of a width of the preimpregnated carbon fiber mat, wherein the width is measured along a plane that extends orthogonal to the first edge and the second edge.

8. The steering wheel of claim 1, wherein a width of the portion of the inner surface adjacent the first edge is from about 10 to about 20 millimeters, wherein the width is measured along a plane that extends orthogonal to the first edge and the second edge.

9. The steering wheel of claim 1, wherein the preimpregnated carbon fiber mat comprises from about 25 wt % to about 70 wt % epoxy resin, based on the total weight of the preimpregnated carbon fiber mat.

10. The steering wheel of claim 9, wherein the preimpregnated carbon fiber mat comprises from about 40 wt % to about 45 wt % epoxy resin, based on the total weight of the preimpregnated carbon fiber mat.

11. The steering wheel of claim 1, wherein the preimpregnated carbon fiber mat has a basis weight of from about 300 $g/m^2$ to about 400 $g/m^2$.

12. A method of wrapping a steering wheel for a vehicle comprising:

wrapping a preimpregnated carbon fiber mat comprising an epoxy resin around a frame of a steering wheel, the preimpregnated carbon fiber mat having a first edge and a second edge that are opposite and spaced apart from each other, the mat having an inner surface that faces the frame and an outer surface;

disposing a portion of the inner surface adjacent the first edge over a portion of the outer surface adjacent the second edge in direct contact with the portion of the outer surface; and heat curing the preimpregnated carbon fiber mat, wherein during curing, the epoxy resin directly couples the portion of the inner surface adjacent the first edge to the portion of the outer surface adjacent the second edge.

13. The method of claim 12, further comprising applying an adhesive that is separate from the epoxy resin between an adhesive portion of the inner surface and a substrate disposed between the frame and the inner surface of the preimpregnated carbon fiber mat, the adhesive portion being separate from the portion of the inner surface adjacent the first edge, and wrapping the adhesive portion around the substrate.

14. The method of claim 13, wherein applying the adhesive comprises applying the adhesive to the adhesive portion of the inner surface.

15. The method of claim 14, wherein applying the adhesive further comprises applying the adhesive to the substrate.

16. The method of claim 13, wherein applying the adhesive comprises applying the adhesive to the substrate.

\* \* \* \* \*